United States Patent
Tuttle, deceased

[15] 3,701,990
[45] Oct. 31, 1972

[54] FIBER OPTIC DISPLAY DEVICE

[72] Inventor: Fordyce E. Tuttle, deceased, late of 1017 North Lake Way, Palm Beach, Fla. by Eleanor Porter Tuttle, executrix

[22] Filed: Dec. 23, 1969

[21] Appl. No.: 887,567

[52] U.S. Cl. ................ 346/1, 340/6, 346/107 R, 350/96 B
[51] Int. Cl. .............................................. G01d 5/26
[58] Field of Search .......... 346/107, 33 C, 33 B, 108; 350/96 B; 355/1, 2; 340/15.5 TC, 16, 6; 181/26

[56] References Cited

UNITED STATES PATENTS

| | | |
|---|---|---|
| 1,149,976 | 8/1915 | Furber ..................... 181/26 |
| 2,257,859 | 10/1941 | Rosaire et al. ............ 181/26 X |
| 2,144,812 | 1/1939 | Rieber .................. 340/15.5 X |
| 2,427,421 | 9/1947 | Rieber .................. 340/15.5 X |
| 2,951,736 | 9/1960 | Black ..................... 346/107 X |
| 3,458,655 | 7/1969 | Thourson ................... 178/30 |
| 3,500,438 | 3/1970 | Hunra et al. ................ 346/108 |

*Primary Examiner*—Joseph W. Hartary
*Attorney*—Eugene F. Malin

[57] ABSTRACT

Signals from an array of different energy transducers representative of a vibrational energy wave are correlated in a predetermined recording matrix so that the relative azimuth direction of the vibrational energy wave from the array of transducers is recorded on a moving film having a speed that compensates for that of the moving vibrational energy wave to provide a final display having readily identifiable directional information of the received vibrational energy wave. Transducer signals are transferred from the transducers to a matrix pattern with the use of fiber optical elements.

7 Claims, 4 Drawing Figures

PATENTED OCT 31 1972 3,701,990
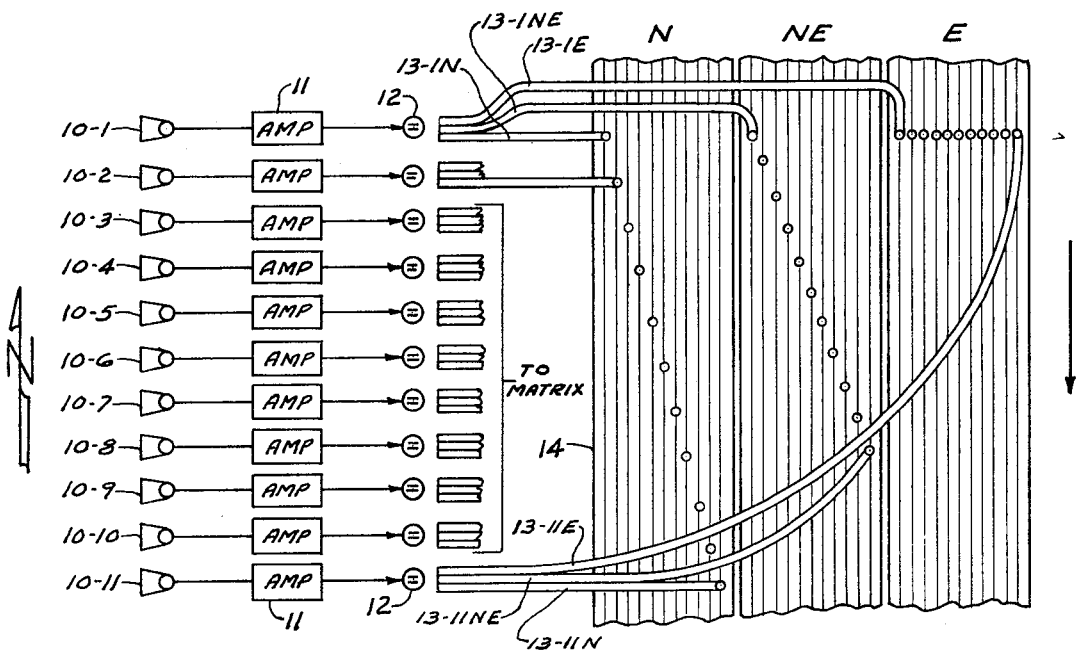
FIG. 1
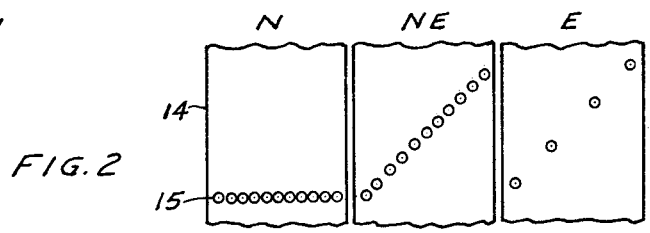
FIG. 2
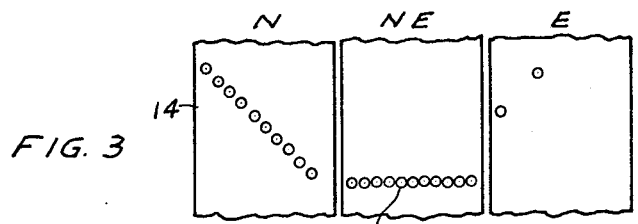
FIG. 3
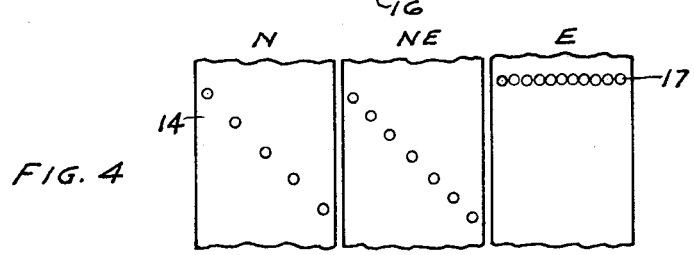
FIG. 4
FORDYCE E. TUTTLE, DECEASED,
BY ELEANOR PORTER TUTTLE, EXECUTRIX
INVENTOR.
ATTORNEY

FIBER OPTIC DISPLAY DEVICE

BACKGROUND OF THE INVENTION

This invention relates generally to signal detection and direction determining apparatus, and relates particularly to a device capable of receiving signals from a static array of energy transducing devices representative of a vibrational energy wave and correlating them into a pattern of signals to produce a visual display showing the direction of the vibrational energy wave in an easily and readily observeable form.

When a predetermined array of transducers are used to receive sonic or other vibrational waves which may originate in one or more of a variety of locations with respect to the predetermined array, because of the time variation of the receipt of the vibrational wave as a function of direction with respect to different transducers, the resulting transducer signals will be a function of the pattern of a predetermined array of transducers with respect to the origin of the vibrational waves. In the past, delay lines have been used to produce an output as a result of the specific directional component of a wave propagation by use with particularly positioned transducers to obtain the effect of simultaneous arrival of the signals in a display showing a particular direction of interest.

In accordance with one aspect of applicant's invention, information received from the array of static transducers is correlated in a matrix visual display system by the use of fiber optic transmission elements arranged with respect to a moving photographic film to provide a predetermined display pattern allowing easily identifiable information patterns corresponding to a particular direction of the received energy wave.

BRIEF DESCRIPTION OF THE INVENTION

A method and apparatus for visually displaying signals received from an array of particularly positioned transducers representative of a vibrational energy wave utilizing a fiber optic recording matrix for providing directional information of the energy wave on a photographic film display. The static array of transducing means are arranged in such a manner as to provide a characteristic energizing of each particular transducer means as a function of received vibrational wave direction. The received signals are converted into optical signals from each transducer means and are transmitted into a matrix pattern by fiber optical elements and recorded upon a moving film, the speed of which is correlated to the speed of the received energy wave as it traverses between the different transducer means. The matrix is so arranged that each transducing element has a fiber optic element representative of every direction to be ascertained by the display device, the matrix being a predetermined arrangement in columns of the various fiber optical end points, with each column representing a particular direction and arranged to provide a particular pattern on the moving film. The displayed signals also provide for fairly accurate interpolation of intermediate azimuth readings. Applicant's apparatus and method may be used in underwater oil or mineral exploration, or the detection of underwater transient energy waves. The transducer means array may be vertical, horizonal, or circular with a transmitter at its center, or in a barrel hoop configuration.

It is an object of this invention to provide a method and apparatus for visually displaying received energy signals on a film with a representative pattern correlated to the direction of a received energy wave.

It is another object of this invention to provide a detecting and recording device for correlating received information into a visual pattern from a particular matrix using fiber optic elements.

It is still another object of this invention to provide an apparatus for receiving energy from a positioned array of transducers and converting energy from each transducer representing an energy wave into a recorded display pattern representative of the direction of the received energy wave.

And yet another object of this invention is to provide a sonic wave detecting and displaying apparatus for detecting and displaying the direction of a received sonic energy wave.

In accordance with these and other objects which will be apparent hereinafter, the instant invention will now be described with particular reference to the accompanying drawing.

BRIEF DESCRIPTION OF THE DRAWING

In the drawing:

FIG. 1 is a schematic diagram of applicant's invention.

FIGS. 2, 3, and 4 show developed film segments having a display in accordance with applicant's invention.

PREFERRED EMBODIMENT OF THE INVENTION

Referring now to the drawing, and in particular to FIG. 1, an array of eleven transducers, which may be hydrophones, indicated at 10-1 through 10-11 are shown. In this embodiment, the transducer array is shown arranged along a line oriented in a north/south direction, with the distance from the first transducer 10-1 to the last transducer 10-11 being equal to 2,600 feet (or approximately one-half mile), the distance that sound travels in water in one-half second. Thus, an energy wave originating from a north direction will be received at transducer 10-11, one-half second after being received at transducer 10-1. Each transducer is coupled to an amplifier 11. The amplified signal is then directed to an element which converts it into a light wave signal, such as an cathode ray tube or a glow lamp 12. Adjacent each glow lamp 12 is a packet or bundle of fiber optical elements, each fiber optic element representing a particular azimuth to be measured, and shown in this embodiment as three fiber optic elements, 13-1N, 13-1NE, and 13-1E, representing the north azimuth, northeast azimuth, and the east azimuth, respectively. In each bundle adjacent each glow lamp 12 are, as shown in this example, three such fiber optic elements. The opposite end of each fiber optic element from the glow lamp 12 is positioned in a matrix pattern shown with respect to an undeveloped film member 14. The matrix pattern is arranged in columns which are representative of a particular azimuth being measured and within which the fiber optical elements from each transducer representative of a particular direction terminate. Within each azimuth column, the recording pattern consisting of fiber optical members from each transducer representative of one particular azimuth is different from the pattern in the other two columns, being a function of the spacing and position of each transducer in the array. For example, in the north matrix column, the fiber optic members 13-1N through 13-11N are arranged down the column in a diagonal fashion. The distance of film 14 from the terminating point of fiber optic element 13-1N to 13-11N is 6-inches, while the film moves past the fiber optic members at a speed of approximately 1 foot per second. Thus, a sonic blast coming from the north direction will be photographed on moving film 14 as a series of dots placed substantially in a straight line, shown in FIG. 2, in the north column of developed film 14 as dotted straight line 15. Referring back to FIG. 1 and the northeast matrix column, the fiber optic members 13-1NE through 13-11NE are shown displayed in a column arrangement that is diagonal but the distance between the first fiber optic member 13-1NE and the last fiber optic member 13-11NE is significantly reduced, because a sonic vibration received from the northeast direction having a reduced travelling distance difference between the first transducer 11-1 and the last transducer 11-11, there will be a reduced signal time between the sonic wave receipt at the first transducer 10-1 and the sonic wave receipt at the last transducer 10-11. Again with the light sensitive film 14 moving adjacent the fiber optic elements in the northeast matrix column, a vibrational wave from the northeast direction will provide an exposure pattern on film 14 as shown in FIG. 3, the matrix northeast column being a series of dots forming a straight line shown at 16. The matrix readout in column north will be distorted accordingly. Referring back to FIG. 1 and to the east matrix column (or west, the results being the same), the fiber optic elements representing the east azimuth 13-1E through 13-11E are positioned in a transverse line, the members terminating in a linear pattern across the azimuth column, which represents a signal received from an east direction that would arrive at each transducer at approximately the same instant of time and therefore will be recorded on moving unexposed film 14 simultaneously as a straight line, shown in FIG. 4 as a series of dots 17 on developed film 14. In FIG. 4, the north and northeast pattern are distorted appropriately.

In practice, with a particular array of transducers 10 parallel to the shore, azimuth of interest could be extended over an angle of about 180° and if a direct azimuth reading is desired for each 10° of the arc, then 18 different fiber optic elements will be contained in each fiber optic bundle and 18 matrix columns will be employed. It is obvious from FIGS. 2, 3, and 4 that a fairly accurate interpolation of a signal received from a direction slightly varying from that of a particular fixed matrix column is possible. Obviously, a particular array of the transducers and the desired film speed may be varied to produce the desired readout pattern. By choosing the proper fiber optic matrix array pattern and display motion, the developed film will provide a visual and readily understandable azimuth information pattern regardless of the of the transducer array pattern.

The particular matrix array or pattern may be different than that shown in this embodiment, and need not have any special arrangement as to the width of the display. The length of the pattern (in the direction of the display means motion) will be dependent upon the display speed desired and the transducer separation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. The method of correlating and displaying multiple signals representing a received vibrational energy wave including the steps comprising:

receiving a vibrational energy wave on a plurality of detectors arranged in a predetermined pattern;

converting the detected energy signal received from each detector into a light wave;

transferring the converted light wave received into a predetermined matrix column and row pattern position, the columns representing a particular azimuth and a row arranged within each column corresponding to the spacing and position of the associated transducer; and moving a light sensitive medium adjacent said matrix pattern at such a velocity to produce on the medium easily identifiable information indicative of the azimuth direction of said received vibrational energy wave.

2. The method of correlating and displaying a received vibrational energy wave as in claim 1, wherein:

the light sensitive medium is a photographic film.

3. An apparatus for correlating and visually displaying azimuth information of a detected vibrational energy wave utilizing signals from an array of transducers comprising:

a light source responsively coupled to each of said transducers, to illuminate whenever said transducer detects a vibrational energy wave;

a plurality of fiber optic elements arranged in bundles, the elements in each bundle having ends adjacent one of said light sources, and having opposite ends arranged in a matrix column and row pattern, wherein the columns represent a particular azimuth and the element ends are arranged within a column in a row corresponding to the spacing and position of the associated transducer; and a light sensitive display means adjacent said fiber optic matrix and moveable relative to said matrix to provide an exposed received light source pattern on said display surface, the relative movement being timed in conjunction with the correlation of said transducer signals of said matrix in order to produce a readily identifiable pattern that is indicative of a particular azimuth direction of the detective energy wave.

4. An apparatus for receiving, correlating, and visually displaying a vibrational energy signal comprising:

a plurality of transducers arranged in a predetermined pattern for receiving and converting a vibrational energy wave into an electrical energy signal:

means coupled to each of said plurality of transducers for converting said electrical energy signal into light waves;

a plurality of light wave transfer elements, each of said light wave transfer elements having one end adjacent to said light converting means and having the opposite end arranged with respect to other corresponding light wave transfer element ends in a predetermined matrix column and row pattern, wherein the columns represent a particular azimuth and the element ends are arranged within each column in a row corresponding to the spacing and position of the associated transducer; and a display means moved adjacent said matrix end of said light wave elements for receiving and displaying the correlated light waves, the display means being moved at such a speed relative to said matrix that azimuth information of the vibrational energy wave is displayed in a readily identifiable pattern of information on said display means.

5. An apparatus as in claim 4, wherein: said identifiable information pattern on said display means is a dotted line.

6. An apparatus for correlating and displaying multiple energy signals representative of a vibrational energy wave received in a plurality of transducers arranged in a particular pattern with respect to each other comprising:

a plurality of light sources, each one coupled to a different one of said transducers, said light source illuminating whenever said coupled transducer is activated by said vibrational energy wave;

a plurality of light wave transmission elements, grouped into bundles, each bundle having one end adjacent to a particular light source, each of the light wave transmission elements within a bundle representative of a particular azimuth relative to said array of transducers, the opposite ends of the light wave transmission elements within a bundle arranged in a matrix column and row pattern wherein the columns represent a particular azimuth and the opposite element ends are arranged within a column in a row correlated to the spacing and position of the associated transducer; and light sensitive display means positioned adjacent said light transmission matrix and moved relative to said light transmission matrix to compensate for time delay differences in the receipt of a vibrational energy wave at each of said transducers, whereby light waves received at said matrix are produced on said display means in a distinctive pattern representative of a particular azimuth of said vibrated energy wave with respect to said plurality of transducers.

7. An apparatus as in claim 6, wherein:
said light wave transmission elements are fiber optical lines.

* * * * *